United States Patent
Nabeya (10) Patent No.: US 8,612,906 B2
(45) Date of Patent: Dec. 17, 2013

(54) APPARATUS FOR AIDING DESIGN OF SEMICONDUCTOR DEVICE AND METHOD

(75) Inventor: Kenichi Nabeya, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 392 days.

(21) Appl. No.: 12/727,701

(22) Filed: Mar. 19, 2010

(65) Prior Publication Data

US 2010/0251194 A1  Sep. 30, 2010

(30) Foreign Application Priority Data

Mar. 31, 2009 (JP) ................................. 2009-084179

(51) Int. Cl.
*G06F 17/50* (2006.01)
(52) U.S. Cl.
USPC .......................................... 716/106; 716/109
(58) Field of Classification Search
USPC ................................................ 716/106–109
See application file for complete search history.

(56) References Cited

U.S. PATENT DOCUMENTS

| | | | | |
|---|---|---|---|---|
| 6,311,147 | B1* | 10/2001 | Tuan et al. | 703/18 |
| 2002/0083403 | A1* | 6/2002 | Murayama | 716/5 |
| 2005/0108668 | A1 | 5/2005 | Kabuo | |
| 2005/0278664 | A1* | 12/2005 | Chaudhry et al. | 716/4 |
| 2008/0066026 | A1* | 3/2008 | Tai et al. | 716/4 |
| 2008/0243403 | A1 | 10/2008 | Furukawa | |

FOREIGN PATENT DOCUMENTS

| | | |
|---|---|---|
| JP | 03047463 | 2/1991 |
| JP | 7-106424 | 4/1995 |
| JP | 20055149273 | 6/2005 |
| JP | 2005-182632 | 7/2005 |
| JP | 2008242713 | 10/2008 |

OTHER PUBLICATIONS

Office Action issued Oct. 23, 2012 in corresponding Japanese Patent Application No. 2009-084179 (4 pages) (2 pages English translation).

* cited by examiner

*Primary Examiner* — Binh Tat
(74) *Attorney, Agent, or Firm* — Staas & Halsey LLP (57) ABSTRACT

An apparatus for aiding a design of a semiconductor device including a plurality of wirings, the apparatus has a display, a memory that stores information corresponding to the wirings, and a processor that obtains a power consumption value of each wiring in reference to the information about the wirings stored in the memory, and displays each of the wirings on the display in a manner that each wiring is distinguishable as to the obtained power consumption value of the each wiring.

9 Claims, 7 Drawing Sheets

APPARATUS FOR AIDING DESIGN OF SEMICONDUCTOR DEVICE AND METHOD

CROSS-REFERENCE TO RELATED APPLICATION

This application is based upon and claims the benefit of priority of the prior Japanese Patent Application No. 2009-084179, filed on Mar. 31, 2009, the entire contents of which are incorporated herein by reference.

FIELD

The embodiment discussed herein relates to an apparatus for adding design of semiconductor device and method.

BACKGROUND

Reduction of power consumption is demanded in LSIs (Large Scale Integrated circuits) used in various fields. Power consumption due to parasitic capacitance of wirings is an element of power consumption in the LSI. A power consumption W due to a parasitic capacitance of a wiring is calculated using the following equation, for example.

$$W = 1/2 \times a \times f \times C \times V \times V$$

Here, "a" represents an operation rate (activity) of a signal, "f" represents an operating frequency, "C" represents a parasitic capacitance of a wiring, and "V" represents a voltage. The operation rate of a signal "a" is also called a toggle rate of a signal or an inversion rate of a signal value. Power consumption can be reduced by improving a wiring design of the LSI so as to reduce parasitic capacitances of wirings. However, power consumption values of respective wirings are not displayed in the conventional LSI layout designing CAD (Computer Aided Design) tool. Therefore, it is difficult to determine a wiring in which parasitic capacitance may be reduced to improve the wiring design of the LSI, and improvement of the wiring design depends on the skill of a designer.

The foregoing equation for calculating the power consumption of the LSI includes a term that is the product of the parasitic capacitance and the operation rate. The parasitic capacitance, which is correlated with a wiring area, can be estimated by the conventional LSI layout designing CAD tool. However, the operation rate cannot be estimated by the conventional LSI layout designing CAD tool.

The conventional LSI layout designing CAD tool has a disadvantage in that it is difficult for a designer to analyze wirings of an LSI and change the design thereof.

[Patent Document 1] Japanese Laid-open Patent Publication No. 07-106424
[Patent Document 2] Japanese Laid-open Patent Publication No. 2005-182632

SUMMARY

According to an aspect of an embodiment, an apparatus for aiding a design of a semiconductor device including a plurality of wirings, the apparatus has a display, a memory that stores information corresponding to the wirings, and a processor that obtains a power consumption value of each wiring in reference to the information about the wirings stored in the memory, and displays each of the wirings on the display in a manner that each wiring is distinguishable as to the obtained power consumption value of the each wiring.

The object and advantages of the art is be realized and attained by means of the elements and combinations particularly pointed out in the claims.

It is to be understood that both the foregoing general description and the following detailed description are exemplary and explanatory and are not restrictive of the art, as claimed.

DESCRIPTION OF EMBODIMENT

According to an embodiment, a designer can easily analyze wirings of a semiconductor device like an LSI and can change the design thereof by viewing emphasized display.

Hereinafter, a design support apparatus, a design support method, and a design support program according to embodiments of the present art is be described with reference to FIG. 3 and other figures.

Figure 1:
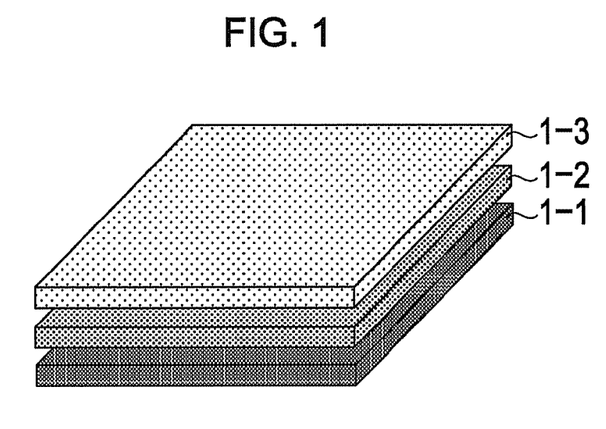
FIG. 1 is a perspective view illustrating a multilayer structure of an LSI.

FIG. 1 is a perspective view illustrating a multilayer structure of an LSI. The LSI has the multilayer structure illustrated in FIG. 1, and wirings thereof are formed in a plurality of wiring layers 1-1, 1-2, and 1-3. A layout designing CAD tool as a design support program is a designing tool for a physical design of a layout and wirings of a semiconductor device like an LSI, and displays such a layout and wirings on a display device of a computer. Accordingly, a designer can edit the displayed wirings.

Figure 2A:
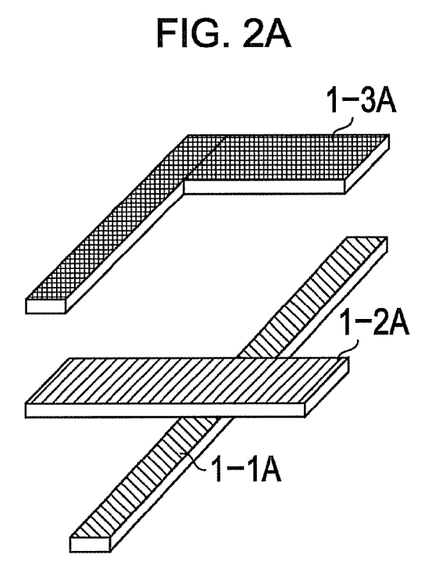
FIGS. 2A and 2B illustrate an example of wirings and an example of displaying corresponding to the wirings, respectively.
Figure 2B:
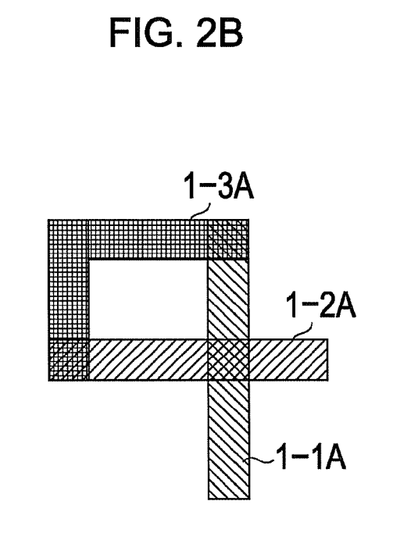

FIGS. 2A and 2B illustrate an example of wirings and an example of displaying corresponding to the wirings, respectively. Specifically, FIG. 2A is a perspective view illustrating wirings 1-1A, 1-2A, and 1-3A respectively formed in the wiring layers 1-1, 1-2, and 1-3 in the LSI, whereas FIG. 2B illustrates a two-dimensional view of the wirings 1-1A, 1-2A, and 1-3A displayed on a display screen of the display by the LSI layout designing CAD tool. Typically, the respective wirings 1-1A, 1-2A, and 1-3A are respectively displayed in different formats, e.g., in different colors or with different types of hatching, in a state of being viewed therethrough in a plan view or a bottom view of the LSI so that the wirings 1-1A, 1-2A, and 1-3A can be distinguished from each other. FIG. 2B illustrates a case where the wirings 1-1A, 1-2A, and 1-3A are respectively displayed with different types of hatching. Such a display manner depicts the layers and parts in a stacked structure of the LSI where the respective wirings 1-1A, 1-2A, and 1-3A are arranged.

In an embodiment of the present art, a design support apparatus uses a design support method. In this embodiment, the present art is applied to a computer system, and a design support program causes a computer as an information processing apparatus including a central processing unit (CPU) as an operation processing device to execute a procedure of the design support method. FIG. 3 is a perspective view illustrating the computer system to which this embodiment is applied.

Figure 3:
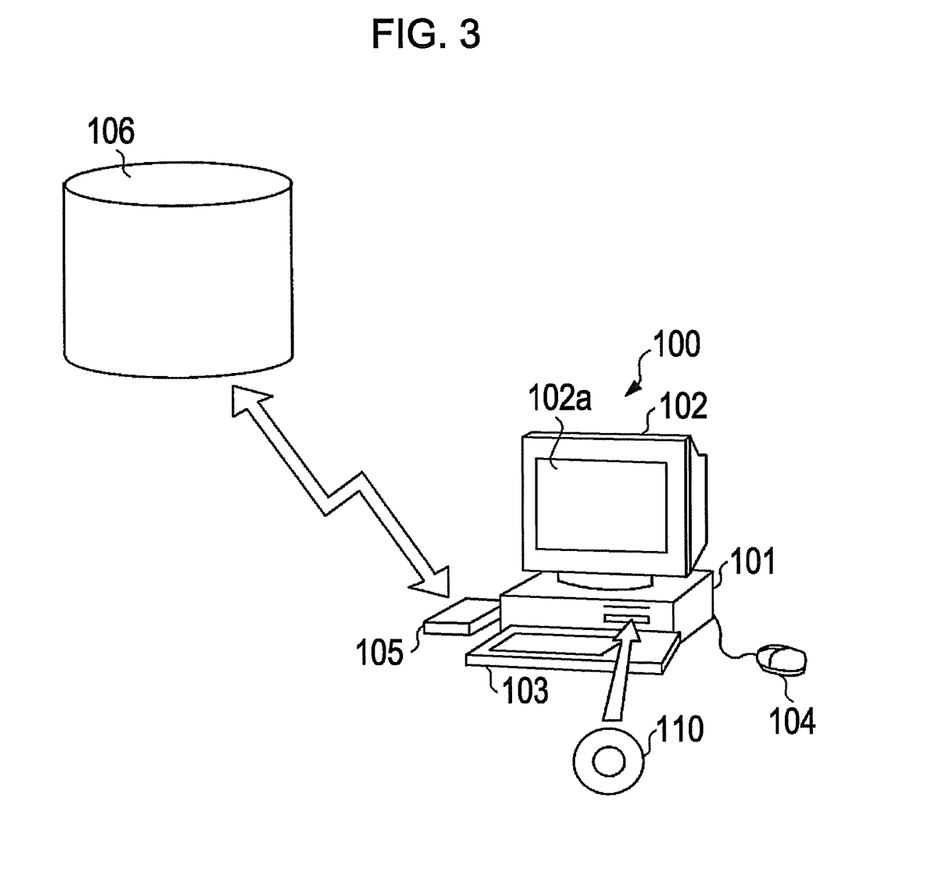
FIG. 3 is a perspective view illustrating a computer system to which an embodiment of the present art is applied.

The computer system 100 illustrated in FIG. 3 includes the following: a main unit 101 containing a CPU, a disk drive driving a disk medium 110, and the like; a display 102 serving as a display device that displays an image on a display screen 102a in response to an instruction received from the main unit 101; a keyboard 103 for inputting various pieces of information into the computer system 100; a mouse 104 for indicating an arbitrary position on the display screen 102a of the display 102; and a modem 105 that accesses an external database or the like to download a program or the like stored in another computer system.

The design support program (an LSI layout designing CAD tool or a layout information display tool), which is stored in a portable recording medium such as the disk medium 110 or downloaded from a recording medium 106 in another computer system by using a communication device such as the modem 105 and which causes the computer system 100 to have a CAD function or at least a design support function of the CAD function, and the design support program is input to the computer system 100 and compiled therein. The design support program causes the computer system 100 (i.e., a CPU 201 described below) to operate as a design support apparatus having the CAD function. The design support program can be stored in a computer-readable storage medium, such as the disk medium 110. The computer-readable storage medium is not limited to a portable recording medium, such as the disk 110, an IC (Integrated Circuit) card memory, a magnetic disk including a floppy disk (registered trademark), a magneto-optical disk, or a compact disk read-only memory (CD-ROM), and includes various types of recording media that can be accessed by the computer system 100 connected via a communication device or communication means, such as the modem 105 or a local area network (LAN).

Figure 4:
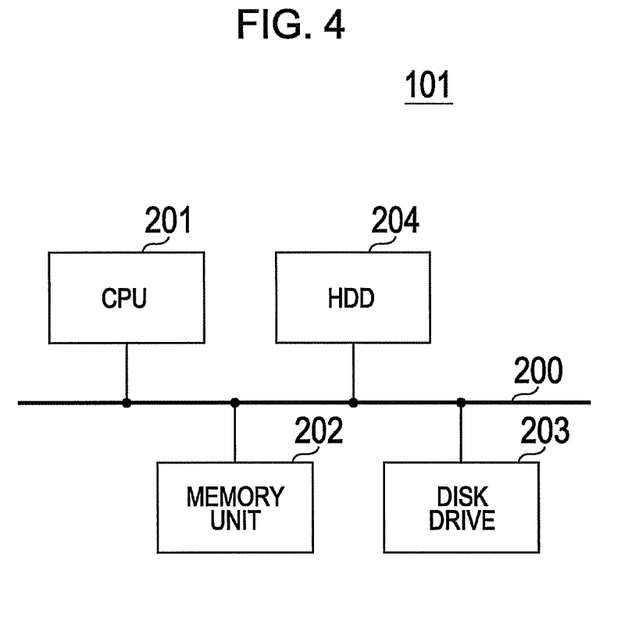
FIG. 4 is a block diagram illustrating a configuration in a main unit of the computer system.

FIG. 4 is a block diagram illustrating a configuration in the main unit 101 of the computer system 100. In FIG. 4, the main unit 101 includes the CPU 201, a memory unit 202 configured using a random access memory (RAM) and a read-only memory (ROM), a disk drive 203 for the disk medium 110 (not depicted in FIG. 4), and a hard disk drive (HDD) 204, which are mutually connected via a bus 200. In this embodiment, the display 102, the keyboard 103, and the mouse 104 are connected to the CPU 201 via the bus 200, but these devices may be directly connected to the CPU 201. In addition, the display 102 may be connected to the CPU 201 via a known graphics interface (not illustrated) that processes input/output image data.

The configuration of the computer system 100 is not limited to that illustrated in FIGS. 3 and 4, and other various known configurations may also be used.

Figure 5:
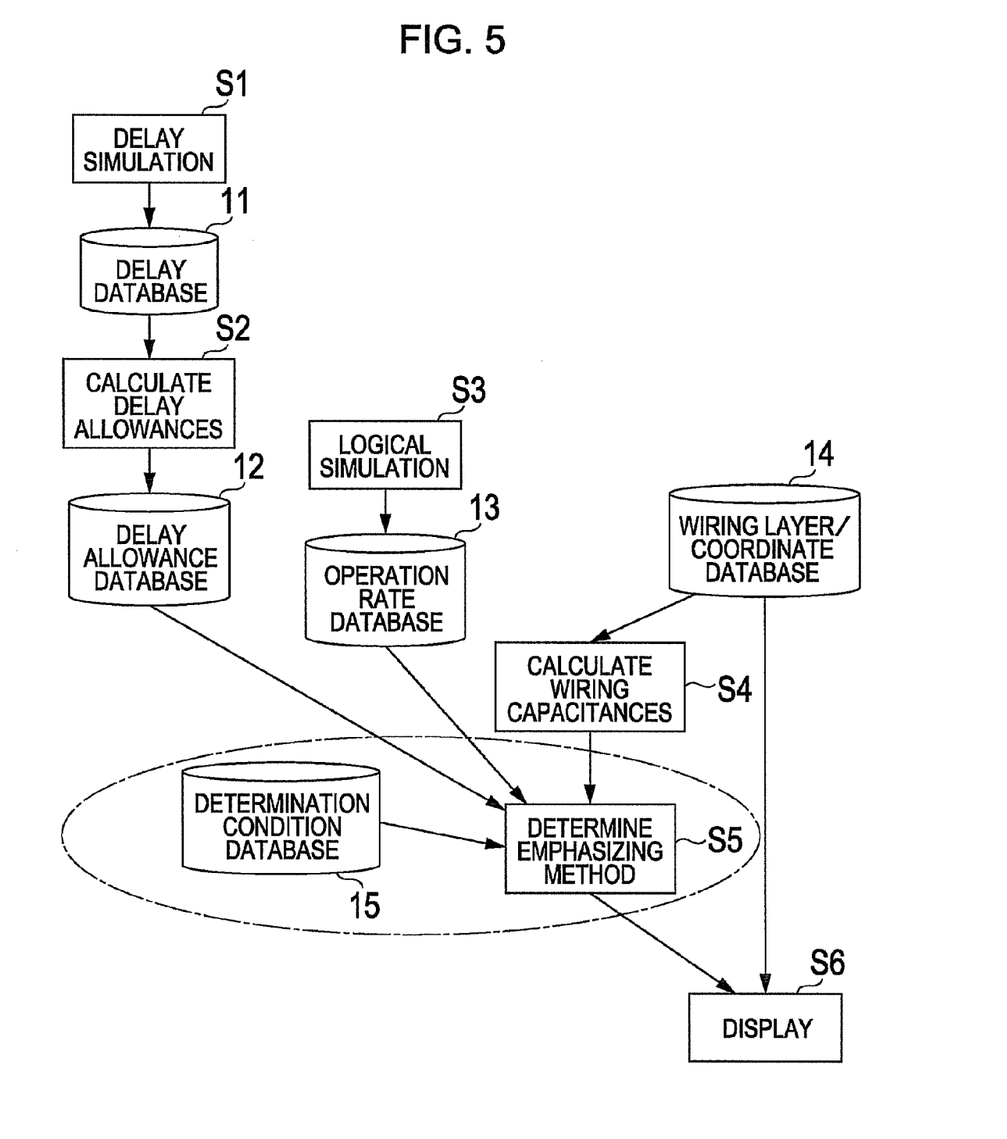
FIG. 5 is a flowchart illustrating a procedure of a design support method.

FIG. 5 is a flowchart illustrating a procedure of the design support method. The process illustrated in FIG. 5 corresponds to a procedure of the design support program (or a layout information display tool) and is executed for a semiconductor device like an LSI as a target to be designed or analyzed by the CPU 201, i.e., by the computer system 100 as a whole. That is, the design support program causes a CPU or computer to realize the functions corresponding to the process illustrated in FIG. 5, and causes the CPU or computer to function as means for executing the process illustrated in FIG. 5.

Referring to FIG. 5, in step S1, a known delay simulation (delay analysis) for determining wiring delays is performed, and delay data of wirings as a result of the delay simulation is stored in a delay database 11. A wiring delay is a time required for a signal to propagate through a target wiring in the LSI. The delay database 11 is formed of an internal storage unit inside the computer system 100, such as the memory unit 202, the disk drive 203, or the HDD 204, or an external storage unit outside the computer system 100. Examples of the delay data stored in the delay database 11 are as follows. In the description given below, "Signal A", "Signal B", and "Signal C" represent signal wirings, and the value following each of "Signal A", "Signal B", and "Signal C" is data such as delay data. In the following description, data such as delay data is indicated by an arbitrary unit for convenience.

Signal A: 2.8
Signal B: 2.7
Signal C: 2.6

In step S2, delay allowance (slack) of the respective wirings are calculated using a known method with reference to the delay database 11, and the calculated delay allowances are stored in a delay allowance database 12. The delay allowance of each wiring indicates an allowance with respect to a minimum value of the wiring delay. The delay allowance database 12 is formed of the internal storage unit or external storage unit of the computer system 100. Examples of the delay allowance data stored in the delay allowance database 12 are as follows.

Signal A: 0.4
Signal B: 0.3
Signal C: 0.1

In step S3, a known logical simulation is performed, and operation rates of the respective wirings as a result of the logical simulation are stored in an operation rate database 13. The operation rate database 13 is formed of the internal storage unit or external storage unit of the computer system 100. Examples of the operation rate data stored in the operation rate database 13 are as follows.

Signal A: 0.4
Signal B: 0.6
Signal C: 0.0

In step S4, wire capacitances of the respective wirings are calculated using a known method with reference to a wiring layer/coordinate database 14 that stores data regarding coordinates and wiring layers of the respective wirings. Examples of the data regarding coordinates and wiring layers of the respective wirings stored in the wiring layer/coordinate database 14 are as follows. "Layer" represents a wiring layer.

Signal A: (0, 0)-(10, 1) Layer 1
Signal B: (10, 8)-(11, 3) Layer 2
Signal C: (20, 20)-(50, 21) Layer 3

Examples of the wire capacitances calculated in step S4 are as follows.

Signal A: 5.4
Signal B: 1.4
Signal C: 3.0

In step S5, a method for emphasizing layout information is determined with reference to the delay allowance database 12, the operation rate database 13, wiring layer/coordinate database 14, and a determination condition database 15. The determination condition database 15 stores determination condition data regarding determination conditions about color patterns, hatching patterns, and blinking patterns of displaying of wirings. Examples of the determination condition data regarding determination conditions, such as color patterns, hatching patterns, and blinking patterns, stored in the determination condition database 15 are as follows. In the following, "Power" represents power consumption information, "Hatching" represents hatching pattern information, "Shade" represents the density information of a color, and "Slack" represents the delay allowance information of a wiring delay.

Power consumption condition of each hatching pattern:
Power>0.5 Hatching1
0.5≥Power>0.1 Hatching2
0.1≥Power Hatching3
Delay allowance condition of each color density:
Slack>0.4 Shade1
0.4≥Slack>0.2 Shade2
0.2≥Slack Shade3

Examples of hatching pattern information and color density information that are determined on the basis of the power consumption information and delay allowance information in step S5 are as follows.

Signal A: Hatching3 Shade2
Signal B: Hatching1 Shade2
Signal C: Hatching2 Shade1

In step S6, layout information is displayed on the display screen 102a of the display 102 by emphasizing the information in the emphasizing method determined in step S5 with reference to the wiring layer/coordinate database 14. The colors information Color1 to Color3 of the wirings Signal A to Signal C displayed in an emphasized manner are determined in accordance with the colors used for wiring layers Layer1 to Layer3. Examples of the layout information displayed in step S6 are as follows. "Color" represents a color information.

Signal A: Color1
Signal B: Color2
Signal C: Color3

Accordingly, on the basis of the determined color shades about the delay allowance information, the determined hatching patterns about the power consumption information of the respective wirings, and the determined colors and coordinates of the respective wirings, the respective wirings are displayed in the determined colors at the determined drawing positions (i.e., coordinates) on the display screen 102a of the display 102, the delay allowance information about the respective wirings are displayed with the determined color shades, and the power consumptions of the respective wirings are displayed with the determined hatching patterns.

Figure 6:
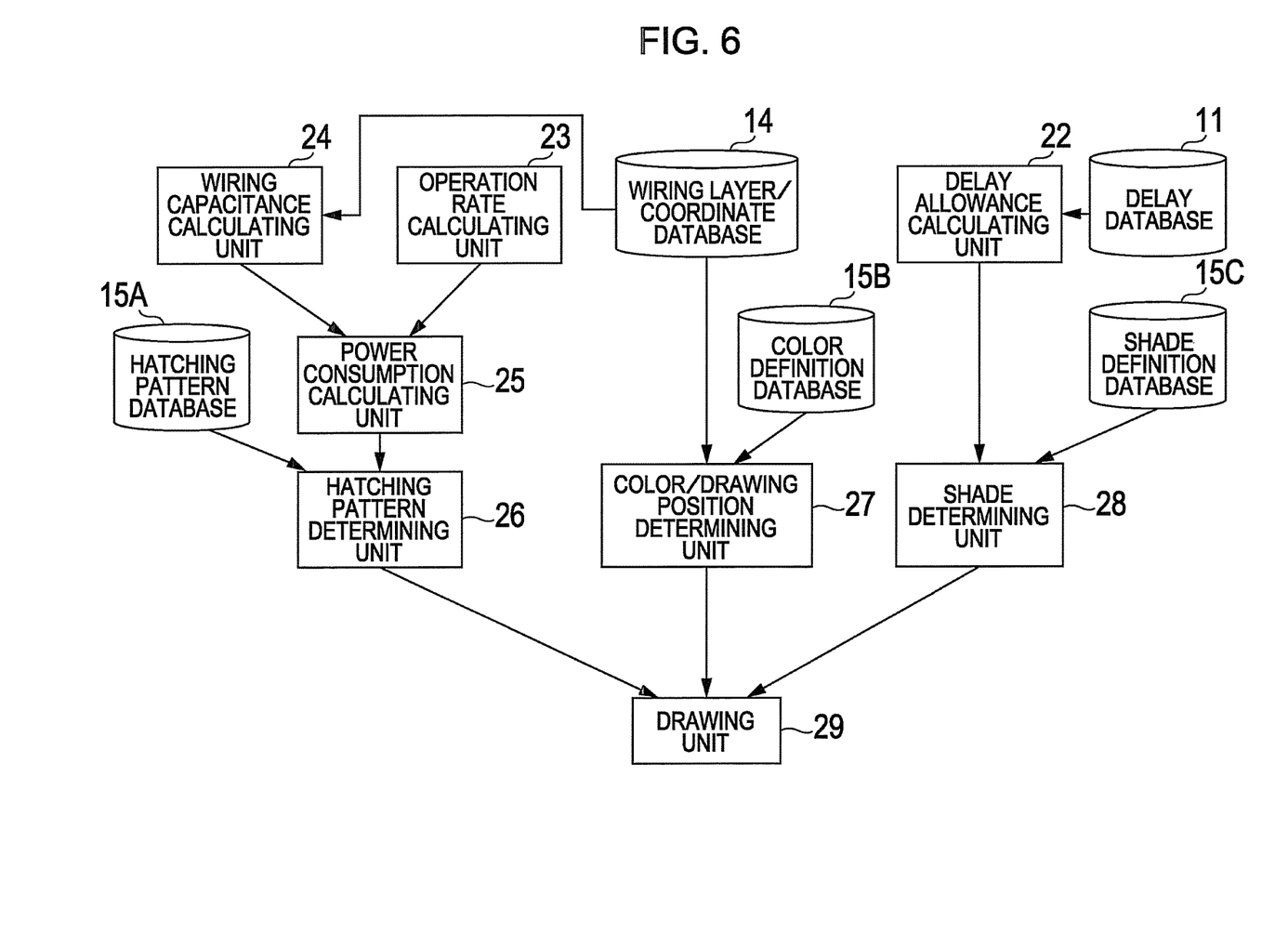
FIG. 6 is a block diagram illustrating respective functions in a case where a design support program causes a computer to realize functions corresponding to the process illustrated in FIG. 5.

FIG. 6 is a block diagram illustrating respective functions in a case where the design support program causes the computer to realize the functions corresponding to the process illustrated in FIG. 5. Referring to FIG. 6, a delay allowance calculating unit (or delay allowance calculating means) 22 calculates delay allowances of respective wirings using a known method on the basis of the delay information of the wirings stored in the delay database 11. A shade determining unit (or shade determining means) 28 determines color shades corresponding to the delay allowances calculated by the delay allowance calculating unit 22 on the basis of the determined color shade information according to the delay allowances defined in a shade definition database 15C.

A wire capacitance calculating unit (or wire capacitance calculating means) 24 calculates wire capacitances of the respective wirings using a known method with reference to the wiring layer/coordinate database 14 that stores the coordinates information and wiring layer information of the respective wirings. An operation rate calculating unit (or operation rate calculating means) 23 calculates operation rates of the respective wirings using a known logical simulation. A power consumption calculating unit (or power consumption calculating means) 25 calculates power consumption information of the respective wirings using a known method on the basis of the wire capacitances and operation rates of the respective wirings. A hatching pattern determining unit (or hatching pattern determining means) 26 determines hatching pattern information corresponding to the power consumptions of the respective wirings calculated by the power consumption calculating unit 25 on the basis of the determined hatching pattern information according to the power consumptions stored in a hatching pattern database 15A.

A color/drawing position determining unit (or color/drawing position determining means) 27 determines colors information and drawing position information of the respective wirings on the basis of the coordinate information and wiring layer information of the respective wirings stored in the wiring layer/coordinate database 14 and the color information of the respective wiring layers defined in a color definition database 15B. The hatching pattern database 15A, the color definition database 15B, and the shade definition database 15C correspond to the determination condition database 15 illustrated in FIG. 5.

On the basis of the color shade information about the delay allowance information determined by the shade determining unit 28, the hatching pattern information about the power consumption information of the respective wirings determined by the hatching pattern determining unit 26, and the color information and drawing position information of the respective wirings determined by the color/drawing position determining unit 27, a drawing unit (or drawing means) 29 displays the respective wirings in the determined colors at the determined positions on the display screen 102a of the display 102, and the drawing unit 29 displays the delay allowance information about the respective wirings with the determined color shades, and the drawing unit 29 displays the power consumption information about the respective wirings with the determined hatching patterns.

According to this embodiment, a plurality of wiring layers can be distinguished from each other by displaying them in different colors. Also, by displaying the power consumption information about the respective wirings with different hatching patterns or the like, the wirings having different power consumption information can be distinguished from each other even if the wirings are placed in the same wiring layer. Furthermore, by displaying the delay allowance information about the respective wirings with different color shades, the wirings having different delay allowances can be distinguished from each other even if the wirings are placed in the same wiring layer. Therefore, a designer can easily analyze the placed wirings in the designed LSI.

In this embodiment, a wiring having a high power consumption can be displayed in an emphasized manner, for example. Specifically, emphasized displaying of a placed wiring having a high power consumption can be performed by varying a display format, e.g., a color, a color shade, a color pattern, a hatching pattern, or a blinking pattern, in accordance with the power consumption, in addition to display information indicating whether the wiring is placed or not and information indicating which wiring layer is used when the wiring is placed. This enables a designer to start improving a wiring design by focusing attention on the emphasized wiring with no necessity for difficult determination depending on the designer's skill. Instead of the power consumption information of the respective wirings, the wire capacitance information or the operation rate information of the respective wirings may be displayed in an emphasized manner, for example. That is, emphasized displaying of wirings as to elements or parameters related to the power consumptions of the respective placed wirings can be performed for a designer, when the designer uses the CAD tool for LSI layout designing.

Also, in this embodiment, it is able to display wirings which can be easily improved in power consumptions in an emphasized manner. For example, in a case where there exist a plurality of wirings having the similar high power consumption, it is desirable to improve the design thereof starting from a portion where the design can be easily changed. As an index of easiness of changing a design, a delay allowance of a wiring represented by a slack value (i.e., an allowance for a minimum value of a wiring delay) may be used. In many cases, a wiring delay may be larger than a predetermined minimum delay value as well as to be smaller than a predetermined maximum delay value so that the LSI operates in a manner expected by a designer. This is because, in a case where the wiring delay is equal to or smaller than the predetermined minimum delay value, racing occurs and the circuit operates abnormally. The predetermined minimum delay value is also called as a "racing delay". A wiring delay has a positive correlation with the parasitic capacitance of the wiring, and thus the wiring delay decreases if the parasitic capacitance is changed in order to reduce power consumption. As a result, the wiring delay can be under the minimum delay value. In such a wiring, reduction of power consumption is hard to improve. For avoiding this problem, it is desired to improve a wiring design starting from a wiring that has a large wiring delay, that has an allowance for the minimum delay value, and that can be easily improved in the parasitic capacitance as the delay is improved. In this embodiment, a wiring that can be easily improved can be displayed in an emphasized manner, and thus a designer can improve a wiring design by focusing attention on the emphasized wiring with no necessity for difficult determination depending on the designer's skill. That is, emphasized displaying of wirings as to elements or parameters related to the difficulty in changing the design of the respective placed wirings can be performed for a designer, when the designer uses the CAD tool for LSI layout designing.

With the above-described emphasized displaying, a designer can easily improve a wiring design for reducing power consumption starting from a portion where a great effect of the improvement can be obtained. Also, the designer can easily improve a wiring design for reducing power consumption starting from a portion where change of the design for improvement can be easily performed. Furthermore, by displaying wirings such that the respective placed wirings can be distinguished from each other on the basis of information about power consumptions, delay allowances, etc., a designer can easily improve a wiring design.

According to the above-described embodiment, respective placed wirings are displayed in determined colors, the delay allowances of the respective placed wirings are displayed with determined color shades, and the power consumptions of the respective placed wirings are displayed with determined hatching patterns. The display formats are not limited to those described above, and a combination of display formats is not limited to the combination described above. The respective placed wirings, the delay allowances of the placed respective wirings, the power consumptions of the respective placed wirings, and the like may be displayed in any display formats as long as they can be distinguished from each other. Desirably, information to be displayed in an emphasized manner may be displayed in such a display format that a designer can easily recognize the information. Furthermore, information that is displayed in an emphasized manner may be at least one of the wire capacitances, operation rates, delay allowances, and power consumptions of the respective placed wirings.

Figure 7:
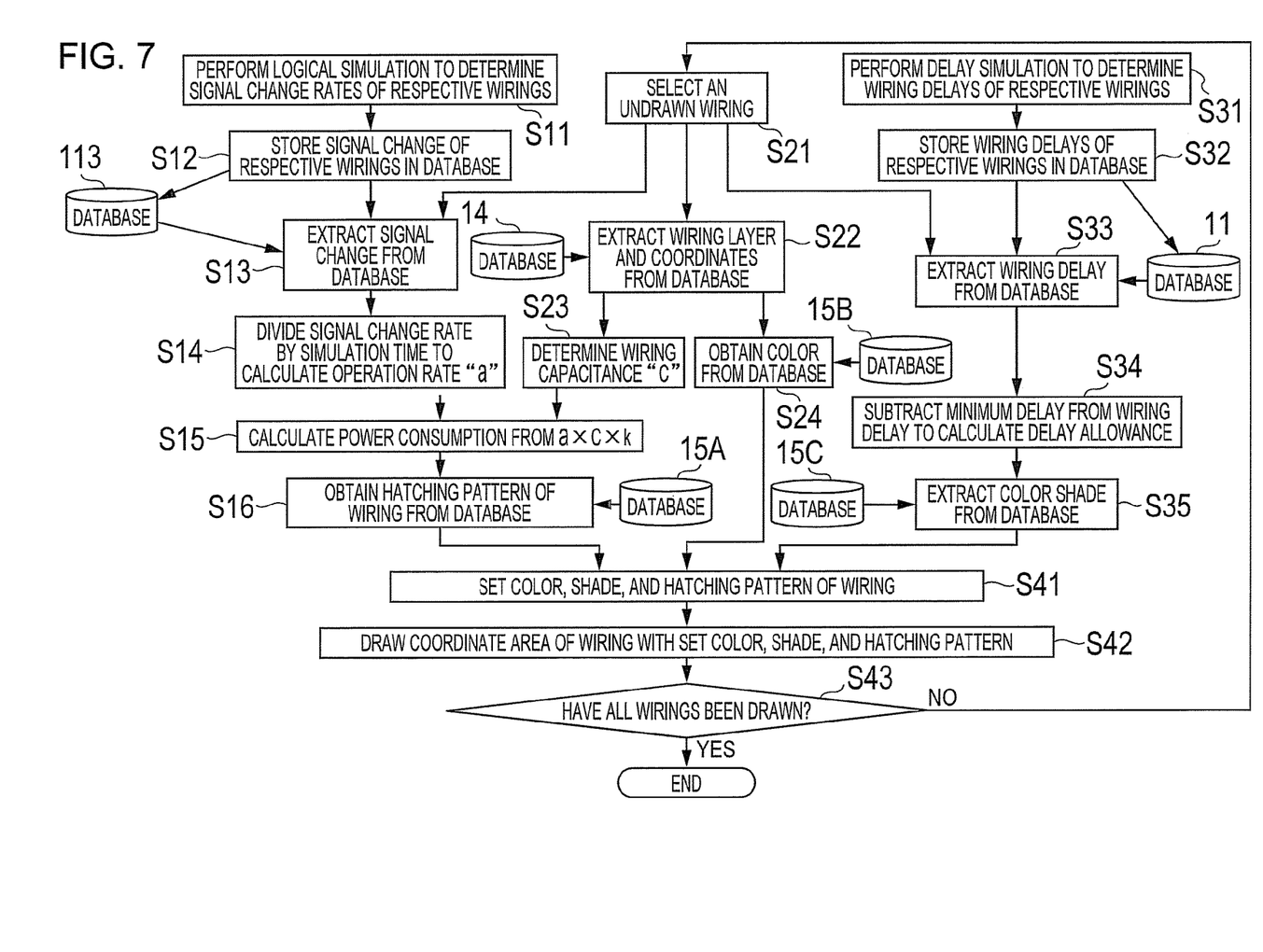
FIG. 7 is a flowchart illustrating a procedure of a design support method.

Next, a design support method according to another embodiment of the present art is described with reference to FIG. 7. FIG. 7 is a flowchart illustrating a procedure of the design support method. The process illustrated in FIG. 7 corresponds to a procedure of a design support program (or a layout information display tool) and is executed for a semiconductor device like an LSI as a target to be designed or analyzed, by the CPU 201 illustrated in FIG. 4, i.e., by the computer system 100 illustrated in FIG. 3. That is, the design support program causes a computer to realize the functions corresponding to the process illustrated in FIG. 7 and causes the computer to function as means for executing the process illustrated in FIG. 7.

Referring to FIG. 7, in step S21, an undrawn wiring is selected, and the process proceeds to steps S13, S22, and S33 described below. On the other hand, in step S11, a logical simulation is performed to determine signal change rates of respective placed wirings. In step S12, the signal change rates corresponding to the respective placed wirings are stored in a signal change rate database 113. In step S13, the signal change rate corresponding to the placed wiring selected in step S21 is extracted from the signal change rate database 113. In step S14, the number of signal change times is divided by a simulation period to calculate an operation rate "a".

In step S22, the wiring layer and coordinates of the placed wiring selected in step S21 are extracted from the wiring layer/coordinate database 14. In step S23, a wire capacitance "C" is determined on the basis of the wiring layer and coordinates of the placed wiring extracted in step S22. In step S24, color information of the wiring layer is obtained from the color definition database 15B on the basis of the wiring layer and coordinates of the placed wiring selected in step S21. In step S24, colors information Color 1, Color 2, and Color 3 of respective wiring layers Layer 1, Layer 2, and Layer 3 are obtained. For example, the colors information Color 1, Color 2, and Color 3 are blue, red, and yellow, respectively.

Layer 1: Color 1
Layer 2: Color 2
Layer 3: Color 3

In step S15, the operation rate "a" obtained in step S14 and the wire capacitance "C" obtained in step S23 are multiplied by a certain coefficient "k", so that a power consumption (=a×C×k) is calculated. For example, the following power consumption information "Power" is calculated in step S15.

0.4≤Power Hatching1
0.2≤Power<0.4 Hatching2
Power<0.2 Hatching3

In step S16, on the basis of the power consumption calculated in step S15, a hatching pattern of the power consumption of the wiring selected in step S21 is obtained from the hatching pattern database 15A.

On the other hand, in step S31, a delay simulation is performed to determine wiring delays of the respective placed wirings. In step S32, the wiring delays of the respective placed wirings are stored in the delay database 11. In step S33, the wiring delay of the wiring selected in step S21 is extracted from the delay database 11. In step S34, a minimum wiring delay is subtracted from the wiring delay to calculate a delay allowance. In step S35, color shade information corresponding to the wiring delay of the wiring selected in step S21 is extracted from the shade definition database 15C on the basis of the calculated delay allowance. In step S35, the following color shade information corresponding to the wiring delay is extracted, for example.

0.4≤Slack Shade1
0.2≤Slack<0.4 Shade2
Slack<0.2 Shade3

In step S41, the hatching pattern information corresponding to the power consumption information corresponding to the wiring obtained in step S16, the color information corresponding to the wiring layer obtained in step S24, and the color shade information corresponding to the delay allowance obtained in step S35 are set. In step S42, a coordinate area of the wiring is drawn with the set hatching pattern, color, and color shade. In step S43, it is determined whether all the wirings as targets of analysis or change of the design have been drawn. If a determination result is "NO", the process returns to step S21. If a determination result is "YES", the process ends.

Figure 8:
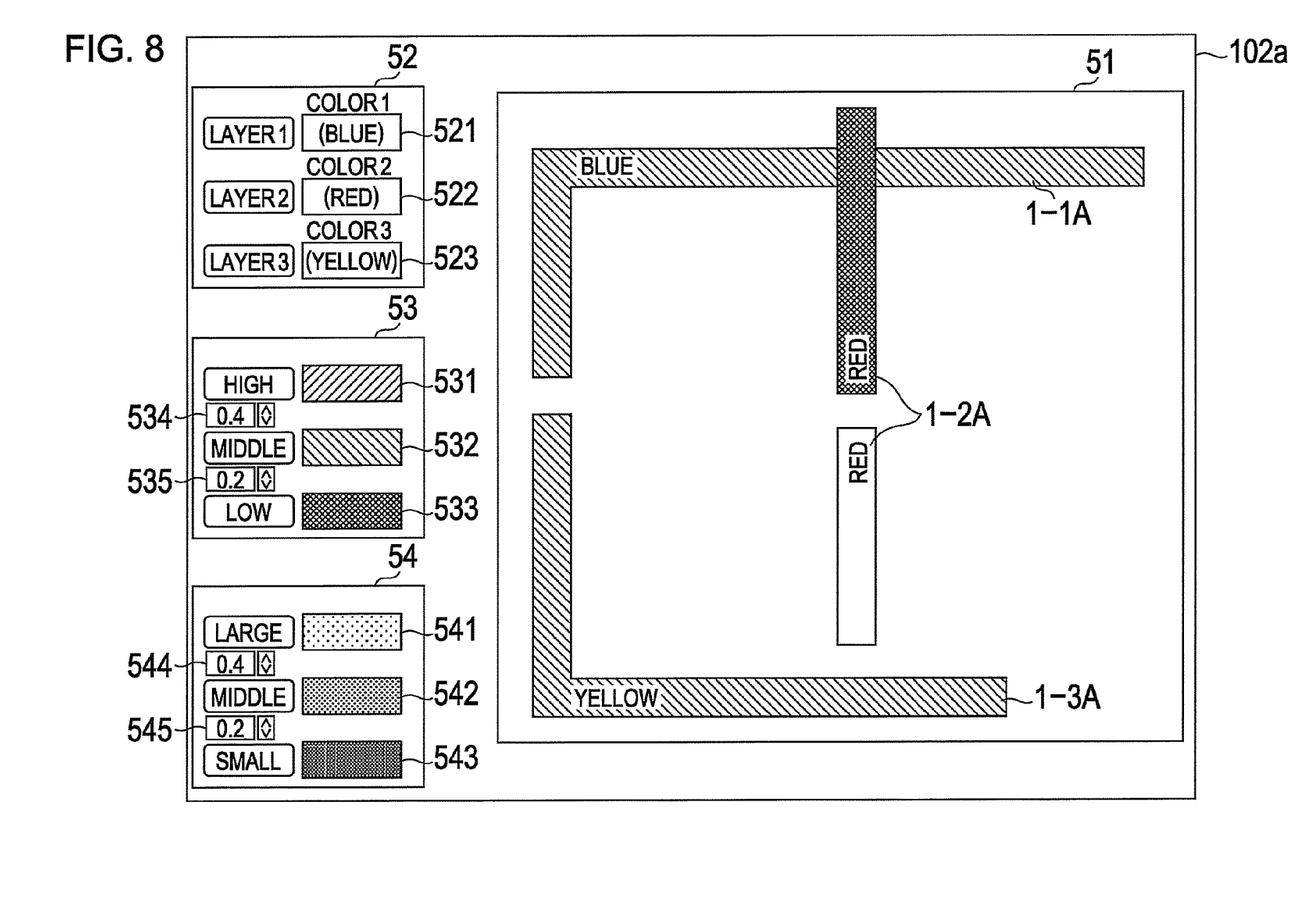
FIG. 8 illustrates an example of a display screen.

FIG. 8 illustrates an example layout of the display screen 102a. Referring to FIG. 8, the followings are displayed on the display screen 102a of the display 102: a wiring edit area 51; a wiring layer color customization area 52; a power consumption hatching customization area 53; and a delay allowance shade customization area 54.

Wirings 1-1A, 1-2A, and 1-3A, which are targets of analysis or change of the design, are displayed in the wiring edit area 51. In the wiring edit area 51, an editing process can be performed as in a case of an editing in the conventional layout design. For example, a wiring can be added or deleted, a wiring layer can be changed, or a wiring shape can be changed. The editing process is executed by the CPU 201 on the basis of an instruction from a designer input through the keyboard 103 or the mouse 104. In addition to the above-described editing process, colors of displayed wiring layers can be specified in the wiring layer color customization area 52, hatching patterns indicating the power consumptions of the respective wirings can be specified in the power consumption hatching customization area 53, and color shades indicating the delay allowances of the respective wirings can be specified in the delay allowance shade customization area 54 in this embodiment.

The wiring layer color customization area 52 is an area for displaying allocation of colors of respective wiring layers and for setting and changing allocation of colors. FIG. 8 illustrates a case where the colors Colon1, Color2, and Color3 are allocated to the wiring layers Layer1, Layer2, and Layer3, respectively. For example, the colors Colon1, Color2, and Color3 are blue, red, and yellow, respectively. In color allocation to the respective wiring layers, colors different from each other may be automatically set by default, or a designer may manually set colors to fields 521, 522, and 523 corresponding to the wiring layers by using the keyboard 103 or the mouse 104. Furthermore, the color allocation to the respective wiring layers that is set automatically or manually can be changed when a designer changes the data input to the fields 521, 522, and 523 by using the keyboard 103 or the mouse 104.

The power consumption hatching customization area 53 is an area for displaying allocation of hatching patterns indicating the power consumptions of the respective wirings and for setting and changing allocation of hatching patterns. FIG. 8 illustrates a case where hatching patterns indicating power consumptions are allocated to the respective placed wirings. For example, an upward-sloping hatching pattern indicates a high power consumption, a downward-sloping hatching pattern indicates a middle power consumption, and a cross hatching pattern indicates a low power consumption. A reference for determining a power consumption is input to determination reference fields 534 and 535 automatically by default, or manually by a designer through the keyboard 103 or the mouse 104. In this example, the value input to the determination reference field 534 is 0.4 (arbitrary unit), so that a placed wiring having a power consumption of over 0.4 is indicated by an upward-sloping hatching pattern. On the other hand, the value input to the determination reference field 535 is 0.2 (arbitrary unit), so that a placed wiring having a power consumption of 0.4 or less and over 0.2 is indicated by a downward-sloping hatching pattern, and that a placed wiring having a power consumption of 0.2 or less is indicated by a cross hatching pattern. In the allocation of hatching patterns indicating the power consumptions of the respective placed wirings, hatching patterns different from each other may be automatically set by default, or hatching patterns (or codes representing hatching patterns) may be manually set to fields 531, 532, and 533 for respective wirings by a designer through the keyboard 103 or the mouse 104. Furthermore, the allocation of hatching patterns to the respective wirings that is set automatically or manually can be changed when a designer changes the data input to the fields 531, 532, and 533 by using the keyboard 103 or the mouse 104.

The delay allowance shade customization area 54 is an area for displaying allocation of color shades indicating the delay allowances of the respective placed wirings and for setting and changing allocation of color shades. FIG. 8 illustrates a case where color shades indicating delay allowances are allocated to the respective placed wirings. For example, a low-level shade indicates a large delay allowance, a middle-level shade indicates a middle delay allowance, and a high-level shade indicates a small delay allowance. A reference for determining a delay allowance is input to determination reference fields 544 and 545 automatically by default, or manually by a designer through the keyboard 103 or the mouse 104. In this example, the value input to the determination reference field 544 is 0.4 (arbitrary unit), so that a placed wiring having a delay allowance of over 0.4 is indicated by a low-level shade. On the other hand, the value input to the determination reference field 545 is 0.2 (arbitrary unit), so that a placed wiring having a delay allowance of 0.4 or less and over 0.2 is indicated by a middle-level shade, and that a placed wiring having a delay allowance of 0.2 or less is indicated by a high-level shade. In the allocation of color shades indicating the delay allowances of the respective placed wirings, color shades different from each other may be automatically set by default, or color shades (or codes representing color shades) may be manually set to fields 541, 542, and 543 for respective placed wirings by a designer through the keyboard 103 or the mouse 104. Furthermore, the allocation of color shades to the respective placed wirings that is set automatically or manually can be changed when a designer changes the data input to the fields 541, 542, and 543 by using the keyboard 103 or the mouse 104.

As can be understood from FIG. 8, in the wiring edit area 51, the respective wirings 1-1A, 1-2A, and 1-3A are displayed in different colors so that the wiring layers can be distinguished from each other, the power consumptions are displayed with different hatching patterns so that the power consumptions can be distinguished from each other, and the delay allowances are displayed with different color shades so that the color shades can be distinguished from each other. Accordingly, a designer can easily analyze the respective placed wirings 1-1A, 1-2A, and 1-3A and change the design thereof by viewing the display in the wiring edit area 51. Furthermore, the range of power consumptions to be distinguished and/or the range of delay allowances to be distinguished can be optionally changed by a designer in accordance with the values set in the fields in the power consumption hatching customization area 53 and/or the delay allowance shade customization area 54. Therefore, an appropriate and designer-friendly display based on the accuracy of analysis and change of the design desired in a layout design can be provided.

As can be understood from FIG. 8, in the wiring edit area 51, the wire whose power consumption value is max and slack value is least may be distinguished from other wires.

Exemplary embodiments of the present art have been described above. It should be understood that the present art is not limited to the above-described embodiments and that various modifications and improvements are acceptable within the scope of the present art.

According to the disclosed design support apparatus, design support method, and design support program, wirings of an LSI can be easily analyzed and the design of the wirings can be easily changed.

As mentioned above, the present invention has been specifically described for better understanding of the embodiments thereof and the above description does not limit other aspects of the invention. Therefore, the present invention can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An apparatus for aiding a design of a semiconductor device including a plurality of wirings, the apparatus comprising:
    a computer processor that executes instructions to:
        obtain a power consumption value based upon wiring capacitance and signal activities of each wiring, in reference to stored information about the wirings,
        obtain wiring delay information in reference to stored wiring delay information about the wirings, and
        display each of the wirings on a display in a manner that each wiring is distinguishable as to the power consumption value of each wiring obtained based upon wiring capacitance and signal activities of each wiring and as to the wiring delay information obtained.
2. The apparatus of claim 1, wherein the delay information includes a slack value corresponding to each wiring on basis of the stored wiring delay information about the wirings, and the wirings are displayed on the display in a manner that a wire is distinguishable as to the slack value.

3. The apparatus of claim 2, wherein the computer processor further displays the wirings on the display in a manner that a wire which power consumption value is max and slack value is least is distinguishable from other wires.

4. A method of controlling an apparatus for aiding a design of a semiconductor device including a plurality of wirings, the method comprising:
    obtaining, by using a computer, a power consumption value based upon wiring capacitance and signal activities of each wiring, in reference to stored information about the wirings;
    obtaining wiring delay information in reference to stored wiring delay information about the wirings; and
    displaying each of the wirings on a display in a manner that each wiring is distinguishable as to the power consumption value of each wiring obtained based upon wiring capacitance and signal activities of each wiring and as to the wiring delay information obtained.
5. The method of claim 4, wherein the delay information includes a slack value corresponding to each wiring on basis of the stored wiring delay information about the wirings, and the method further comprises displaying the wirings on the display in a manner that a wire is distinguishable as to the slack value.

6. The method of claim 5, wherein a wire which power consumption value is max and slack value is least is distinguishably displayed from other wires.

7. A non-transitory computer-readable recording medium storing a program for aiding a design of a semiconductor device including a plurality of wirings, the program causes a computer to execute:
    obtaining a power consumption value based upon wiring capacitance and signal activities of each wiring, in reference to stored information about the wirings;
    obtaining wiring delay information in reference to stored wiring delay information about the wirings; and
    displaying each of the wirings on a display in a manner that each wiring is distinguishable as to the power consumption value of each wiring obtained based upon wiring capacitance and signal activities of each wiring and as to the wiring delay information obtained.
8. The non-transitory computer-readable recording medium of claim 7, wherein the delay information includes a slack value corresponding to each wiring on basis of the stored wiring delay information about the wirings, and the method further comprises displaying the wirings on the display in a manner that a wire is distinguishable as to the slack value.

9. The non-transitory computer-readable recording medium of claim 8, wherein the displaying displays the wirings on the display in a manner that a wire which power consumption value is max and slack value is least is distinguishable from other wires.

* * * * *